Aug. 19, 1924. 1,505,574
J. M. MEYERS
FARM TRACTOR
Filed Nov. 6, 1919 5 Sheets-Sheet 1
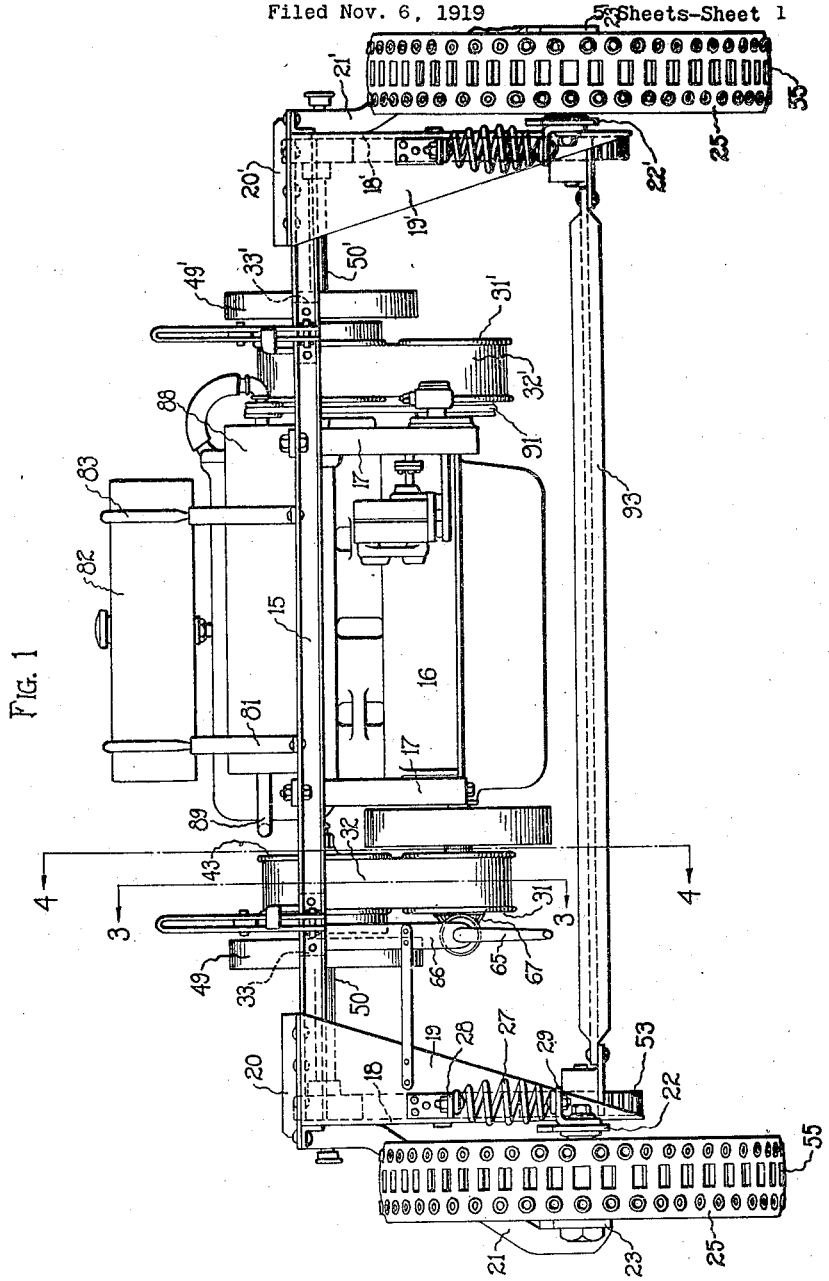
INVENTOR
JOHN M. MEYERS
Blackmore, Spencer & Flint
ATTORNEYS Aug. 19, 1924.
J. M. MEYERS
1,505,574
FARM TRACTOR
Filed Nov. 6, 1919
5 Sheets-Sheet 2
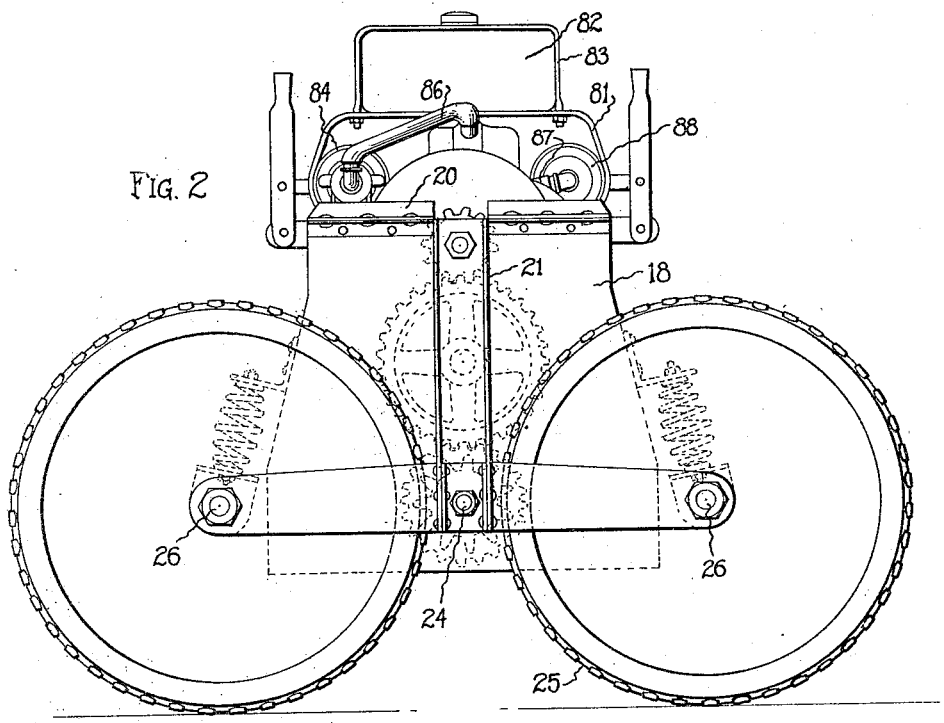
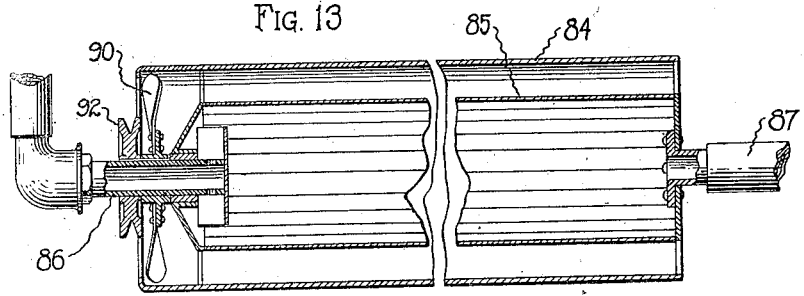
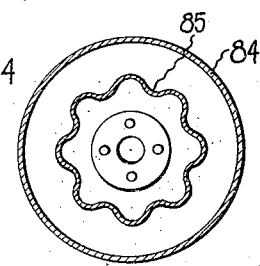
INVENTOR
JOHN M. MEYERS
ATTORNEYS

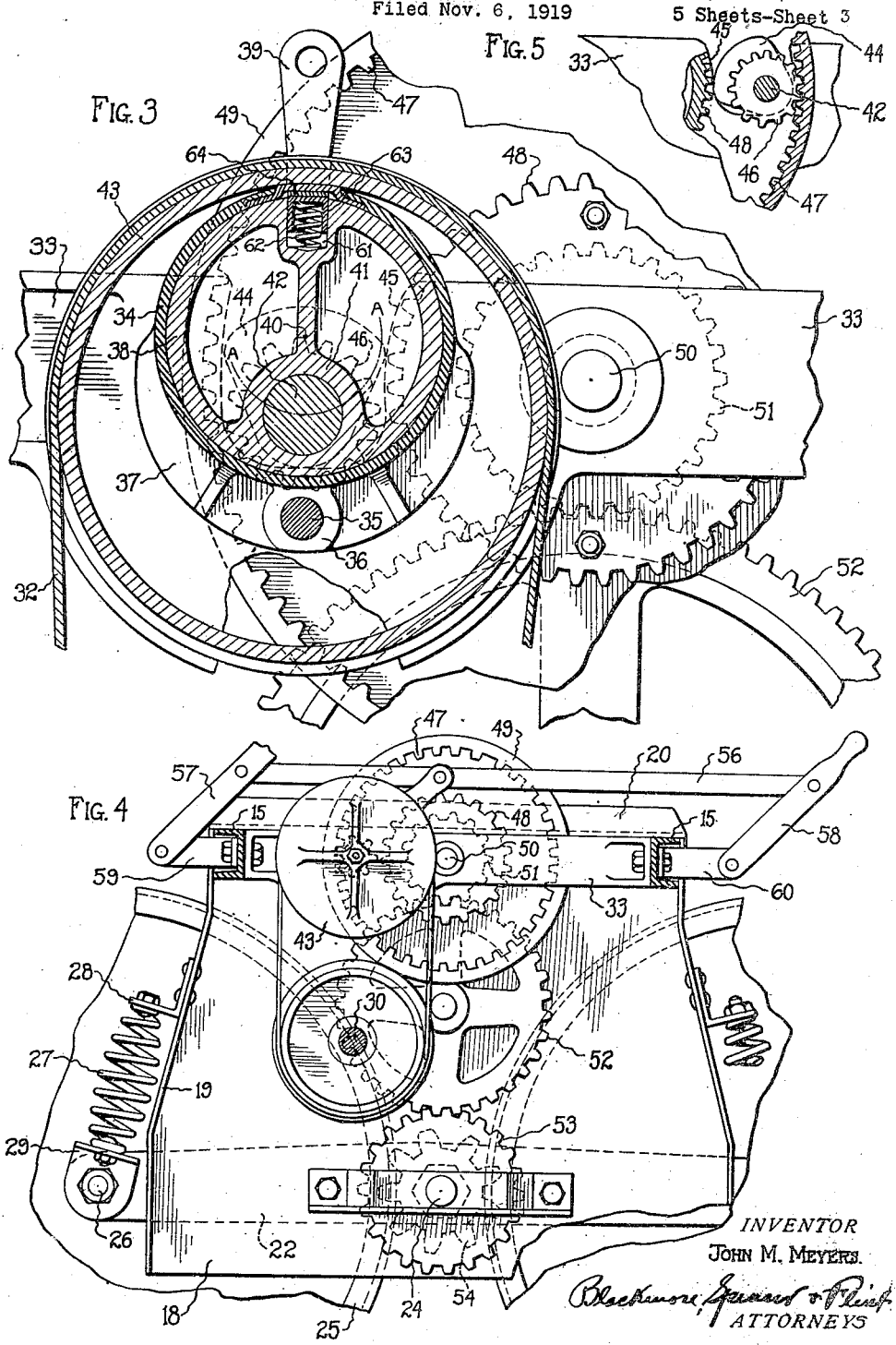

Aug. 19, 1924.

J. M. MEYERS 1,505,574

FARM TRACTOR

Filed Nov. 6, 1919

Inventor
JOHN M. MEYERS

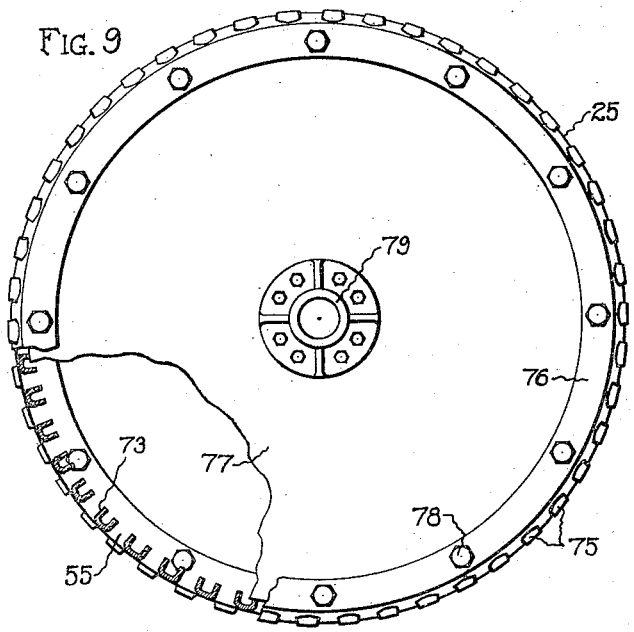
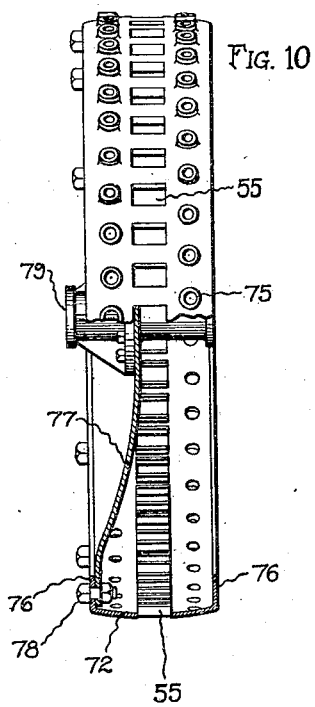
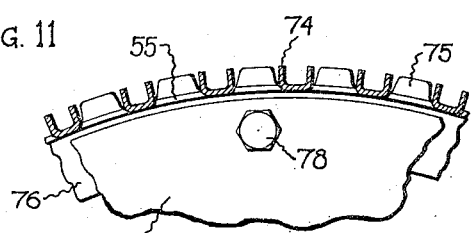
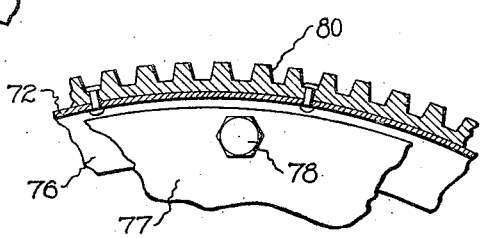

Patented Aug. 19, 1924.

1,505,574

UNITED STATES PATENT OFFICE.

JOHN M. MEYERS, OF JANESVILLE, WISCONSIN, ASSIGNOR TO GENERAL MOTORS CORPORATION, OF DETROIT, MICHIGAN, A CORPORATION OF DELAWARE.

FARM TRACTOR.

Application filed November 6, 1919. Serial No. 336,156.

*To all whom it may concern:*

Be it known that I, JOHN M. MEYERS, a citizen of the United States, and resident of Janesville, Rock County, State of Wisconsin, have invented certain new and useful Improvements in Farm Tractors, of which the following is a specification.

My invention relates to tractors designed particularly for agricultural purposes, and the principal object thereof is to provide a tractor which will be simple in construction and which may be manufactured at small cost; and which may be more easily maneuvered in turning corners, and which may be turned around within a smaller space or turned more abruptly than has heretofore commonly been the case in farm tractors.

A further object of my invention is to provide an improved tractor which is symmetrical as regards the front and rear portions thereof, and which, as a consequence, may be operated equally well in either of two directions; or, as otherwise expressed, to provide a tractor in which either end thereof may be the advancing end or front of the machine.

A further object of my invention is to provide improved transmission mechanism intermediate the driving engine and the driving wheels of the tractor, and through which two pairs of driving wheels upon opposite sides of the tractor may be operated in unison; each pair independently of the other pair, and each pair in either a forward or in a reverse direction.

A further object of my invention is to provide improved driving mechanism for communicating motion to the driving wheels of the tractor.

A further object of my invention is to provide an improved driving wheel for a tractor; and a still further object is to provide certain improvements in and relating to the power plant of the tractor and various of the mechanisms through which the same acts to propel the vehicle.

With the above and other objects of invention in view, my invention consists in the improved tractor and subordinate parts and auxiliary features thereof illustrated in the accompanying drawings and hereinafter described and claimed; and in such variations and modifications thereof, within the scope of the concluding claims, as will be obvious to those skilled in the art to which my invention relates.

In the drawings accompanying and forming a part of this specification and wherein the preferred embodiment of my invention is illustrated;

Figure 1 is a view showing my improved tractor in elevation, and as seen from a position in front thereof.

Figure 2 is a view showing the same in side elevation.

Figure 3 is a view upon an enlarged scale showing a section upon a vertical plane indicated by the line 3, 3 Figure 1, looking toward the left.

Figure 4 is a view upon a smaller scale than Figure 3 and showing a section upon a vertical plane indicated by the line 4, 4 Figure 1, looking toward the left.

Figure 5 is a fragmentary view showing a driving pinion employed in the tractor, and a compound driving gear driven thereby.

Figure 9 is a side view partly broken away and showing one of the driving wheels of the tractor.

Figure 10 is a view showing a driving wheel in end elevation, and broken away in part.

Figures 11 and 12 are views showing modifications of the driving wheel.

Figure 13 is a view showing a cooling device for cooling the cooling water of the engine employed to drive the tractor in section, and upon a vertical longitudinally extending plane.

Figure 14 is a view showing a section of the cooling device shown in Fig. 13 upon a transverse plane.

Figure 6:
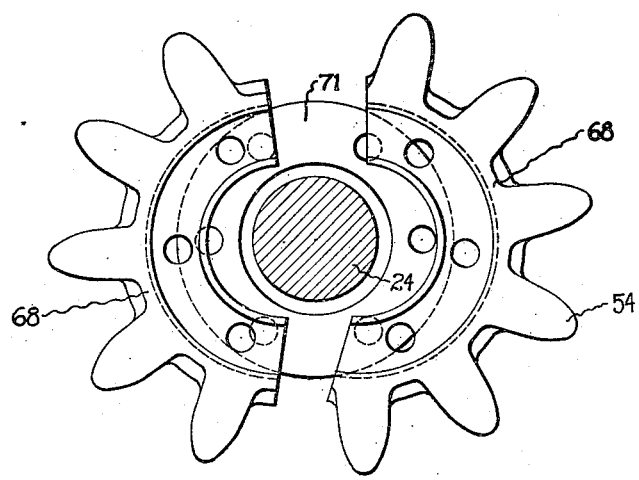
Figures 6, 7 and 8 are fragmentary views showing the driving shaft and pinion whereby the driving wheels are driven.

Referring now to the drawings; the reference numerals 15 designate two parallel channel bars spaced apart from one another and which form the main frame of the tractor; and from which an internal combustion engine, designated by the reference numeral 16, is supported by means of suitable supports 17, the engine being of any desired construction and the arrangement thereof being such that the crank shaft thereof extends substantially parallel with the side members 15 of the frame.

Secured to the ends of the frame members 15 are downwardly extending supporting members or plates 18, 18' which serve as direct supports for the gears which form the reduction gearing of the transmission mechanisms to be hereinafter described; said plates being suitably braced by triangular front and rear end braces 19, 19' and by triangular braces 20, 20' secured in place upon the upper side of the frame members and along the top edges of the end plates at the four corners of the frame provided by the said members. It will be appreciated however that the scheme whereby the end portions are supported in vertical positions and held therein is not involved in this present application, and that any suitable scheme whereby proper strength is secured may be employed.

Extending downwardly from the upper ends of the end plates and outwardly therefrom are centrally disposed struts 21, 21' the lower ends of which are provided each with a suitable bracket, and the reference numerals 22, 23, 22' 23' designate pairs of levers, one pair arranged at each side of the tractor. The middle portions of these levers are pivotally supported by and relative to the end plates and the struts so as to oscillate about a horizontal axis, from which it follows that the two levers 22 and 23, 22' and 23' which constitute each pair are free to swing about a horizontal axis at the lower ends of the plates and struts the position of which is indicated by the reference numeral 24. These levers are spaced apart from one another, the levers 22, 22' lying close to the adjacent end plates 18, 18', while the other levers 23, 23' are arranged close to the brackets aforesaid at the lower ends of the strut members 21, 21'.

Supported between the free outer ends of the two pairs of levers are the four driving wheels of the tractor, each of which is designated by the reference numeral 25, said wheels being rotatable about axles 26 extending between and the ends of which are supported by the said rocking levers; from which it follows that the two wheels at each side of the vehicle are free to rock about the central pivotal support 24 for the rock levers, so that the tractor may adapt itself to unevenness in the ground driven over without unduly straining the frame thereof. Suitable springs 27 are provided, two at each side of the tractor and one at each end of each of the pairs of rocking levers to thereby yieldably hold the said rocking levers and the wheels which they carry in a central position. These springs act between brackets 28, 29 secured in any suitable way one to a vertical extending plate 18 or to a triangular brace 19 at the side thereof, and the other to the inner rocking lever; such a spring being provided at each of the four corners of the tractor, as will be appreciated.

The reference numeral 93 designates the draw bar of the tractor, the ends thereof being secured in any way to the depending plates 18 or equivalent wheel supports at the sides of the tractor, and any suitable hitching device being provided for connecting the tractor with whatever is to be pulled thereby.

The position of the crank shaft of the engine 16 is designated by the reference numeral 30 in Figure 4; and two driving pulleys 31, 31' are secured one to each end of the crank shaft as shown in Figure 1. These belt wheels drive both the driving wheels at the end of the tractor adjacent to a pulley in question through suitable driving mechanisms to be hereinafter described; that is, the belt pulley 31' at the right hand end of the engine drives the two driving wheels 25 at the right hand side of the tractor, while the driving pulley 31 at the left hand end of the engine drives the two driving wheels 25 at the left hand side of the tractor; the driving being accomplished through and by means of the two belts 32, 32' as will next appear.

Referring now to Figures 3 and 4 in which the details of construction and arrangement of the transmission mechanism through which the wheels are driven are shown, these figures show one only of the two driving mechanisms employed in the tractor. The driving mechanisms, however, are alike at each end of the engine, so that it will be necessary to describe only one of them; the driving mechanism illustrated and hereinafter described being the one at the left hand end of the engine and the left hand side of the tractor as the same is seen from a position in front of Figure 1.

The reference numerals 33, 33' designate cross bars or supports, one associated with each driving mechanism, and which cross bars extend between and the ends of which are secured to the channel iron frame members 15; and 34 designates an annular oscillating supporting member or ring supported from the cross bar 33 through and by means of a pivot 35 which extends from said cross bar into a bearing in a boss 36 provided at the lower end of the supporting member, said member being provided with a strengthening rib 37 which merges with the boss; from which it follows that the ring may swing from side to side about the pivot 35 at a center.

Located within the circular opening provided by the supporting member or ring 34 and rotatable therein is an angularly movable or oscillating member 38 provided with a suitable arm 39 formed rigidly therewith, and whereby said member may be oscillated within the ring 34 whereby it is carried, such movement being about a central axis 40 corresponding with the center of the ring 34. This operating member 38 is provided with a bearing 41 within which a spindle 42 is rotatable, and to the right hand end of which a vertically movable belt tightening and power transmitting pulley 43 about which the belt 32 passes is secured, as best shown in Figure 4 of the drawings; the pulley being supported from the right hand end thereof and of the spindle so that the members 34 and 38 are located within the pulley when the parts are assembled.

The member 38 whereby the pulley 43 is moved upward and the belt 32 tightened is also provided with a cam 44 upon its left hand end and which cam operates in a U-shaped recess 45 provided in the cross bar 33; and beyond and to the left of this cam and fast upon the spindle 42 so as to rotate therewith is a pinion 46 which is adapted to mesh with either an outer series of teeth 47 or an inner series of teeth 48 of a double driving gear 49, see Figure 1, as the member 38 is swung to the right or left from the neutral central position in which it is shown in Figure 3 of the drawing; the pulley 43 partaking of such swinging movement as will be appreciated.

The driving gear 49 is secured to one end of a driving shaft 50 which is rotatable in bearings supported by the cross frame 33 and by the end plate 18, and the outer end of said shaft carries a pinion 51 which meshes with gear 52. The gear 52 is rotatable upon a supporting stud shaft or pin which is carried by the end plate 18, and said gear is in mesh with a second gear 53 secured to one end of the axle or shaft 24 about which the rocking levers 22, 23 oscillate; and 54 designates a driving pinion secured to the said shaft and the teeth of which engage openings 55 provided in the driving wheels 25 to thereby drive the tractor; the pinion of each driving mechanism being in driving engagement with the two driving wheels at the side of the tractor at which the mechanism in question is located.

The gear 53 and the driving pinion 54 are both secured to a shaft for which bearings are provided in the end plate 18 and in the bracket at the lower end of the strut member 21 hereinbefore mentioned, to thereby support the shaft at points spaced well apart from one another; and the shaft which supports the said gear and pinion extends through openings in the levers 22, 23 and preferably forms a support for the said levers; although said levers may be supported by hollow bearings carried one by the end plate and the other by the bracket at the lower end of the strut member and extending into openings provided in said levers, should such a method of support be deemed desirable.

When the parts are in the normal central positions in which they are shown in Figure 3 the belt 32 is loose upon the pulleys 31, 43 and motion will not be transmitted through the same and to the driving wheels 25. If, however, angular movement is imparted to the operating member 38 through the arm 39 the said member will rotate within the opening in the ring 34 in which it is supported, and, assuming angular movement in a clock-wise direction to be imparted to the member 38, the effect of such movement will be to carry the spindle 42 upward and to the left; the cam 44 which is integral with the said member 38 cooperating with the right hand side of the U-shaped recess 45 in the frame 33 in which it operates to thereby cause the center of the spindle 42 to move upward and to the left along a path indicated approximately by the line A, A.

This movement of the spindle 42 lifts the pulley 43, thus tightening the belt 32, and at the same time the cam 43 co-operates with the recess 44 within which it operates to move the pinion 46 upon the free end of the spindle into mesh with the internal teeth 47 of the driving gear 49; after which said pulley will be driven by the belt, thus driving the gear 49 and the driving shaft 50 through the spindle 42 and the pinion 46. The driving wheels 25 of the tractor, will therefore be driven through the transmission mechanism in question and here referred to, as the shaft 50 to which the gear 49 is secured is operatively connected with the said wheels through the train of reduction gearing made up of the pinion 51, the gears 52 and 53, and the driving pinion 54 which engages the opening 55 in the rims of the wheels as above explained.

It will be appreciated that if movement is imparted to the movable shifting member 38 in a counter-clock-wise direction, then the cam 44 will engage the surface at the left hand side of the U-shaped recess 45 within which it operates, which movement combined with the movement of the center of the spindle 42 upward and to the right will bring the pinion 46 into driving engagement with the inner gear 48 of the combined gear 49; after which the said gear 49 will be driven in a direction the reverse of the direction in which it is rotated when the said pinion engages the internal teeth 47 of the gear 48.

It will also be appreciated that the speed at which the tractor is driven will depend upon which one of the two concentric toothed portions 47, 48 of the combined driving gear 49 is being driven from the pinion 46 and, as the construction of the tractor in its entirety is such that it will move in one direction as readily as in the other, or such that either end thereof may be regarded as the front end, it follows that the driving mechanism disclosed provides for forward driving at one speed and rear driving at another speed, and, upon turning the tractor entirely around, for forward driving at a speed different from the speed first assumed, and for rearward driving at a speed which also varies from the speed of rearward driving first assumed; thus providing in the tractor as a whole for forward driving at two speeds and also for rearward driving at two speeds.

The operating arm 39 is preferably operated through a link 56 pivotally connected therewith and the ends of which are operatively connected with two operating levers 57, 58 pivotally supported in brackets 59, 60 secured one to each side frame member 15, so that the tractor may be more readily controlled from positions at the front and rear sides thereof than would otherwise be the case.

The oscillating belt tightening and reversing member 38 is provided with a recess 61 at the portion thereof which is uppermost when the parts are in a neutral central position, and a spring 62 is located within this recess and acts against a follower 63 which presses against a friction member 64 located within an opening provided in the peripheral wall of the annular supporting member 34, which friction member is thus pressed into engagement with the inner surface of the pulley 43. It will be appreciated, however, that as said pulley is moved upward due to angular motion imparted to said member 38 within the ring 34 whereby it is supported, such upward movement will move the inner surface of the pulley at the point of engagement between the same and the friction member 64 upward and away from the said friction member, thus leaving the pulley free to rotate. Said friction member, however, serves to hold the pulley 43 against rotation when the same is in its lowermost position at which time the belt 43 is loose upon the pulleys 31, 43, thus preventing rotatory movement of spindle 42 and the pinion 46 except at such times as the belt 32 is tightened, and the pinion in engagement with one or the other of the toothed portions 47, 48 of the compound gear 49.

A starting crank 65 is provided for starting the engine, the same being supported in a hanger 66 depending from the main frame of the tractor and which crank is operatively connected with the crank shaft of the engine through bevel gears 67, although it will be appreciated that any form of starting device may be employed.

Figure 8:
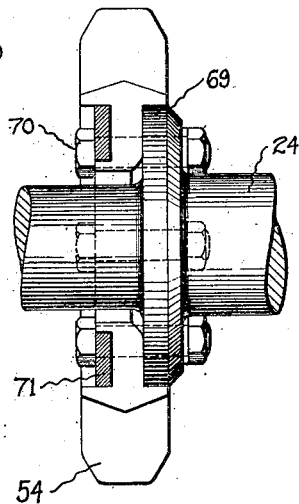
Figure 7:
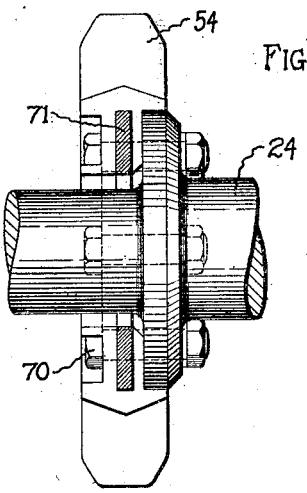

In order to permit the driving pinion 54 to be put in place upon the shaft 24 in between the pair of driving wheels 25 which it drives the said pinion is made in two parts 68, 68, as best shown in Figures 6 to 8, and the shaft is provided with a collar or flange 69 to which the parts of the pinion are secured by means of bolts 70 which extends through holes in the flange and in the parts of the pinion. The pinion is strengthened by a ring 71 which lies within a circular recess provided within the two parts thereof, as shown in Figure 7, or within a like recess formed in the outer side or face of the pinion, as shown in Figure 8, when the parts are assembled, and through which ring the securing bolts 70 pass; thereby providing a scheme whereby an extremely strong driving pinion is provided, and a pinion which may be readily removed and replaced by another without removing the driving wheels or disassembling any part of the machine other than the pinion itself.

Figures 9 and 10 illustrate the driving wheels 25 upon a larger scale and more in detail, said wheels comprising a rim portion 72 in which the openings 55 are formed by a punching process, the material of the rim which is cut free in providing the said openings being turned inward to provide abutments or walls 73 with which the teeth of the pinion 54 engage in driving the wheels, thereby providing extended bearing surfaces between the teeth of the driving pinion and the circumferentially extending series of openings in each driving wheel into which the teeth of the driving pinion enter. These cut free walls may, however, be turned outward, as shown at 74 in Figure 11; extended bearing surfaces being provided for the teeth of the driving pinion 54 quite irrespective of which way the cut free portions of the rim are bent or turned in providing the openings into which the teeth of the driving pinion enter in driving the main driving wheels.

The rim 72 is also preferably provided with two circumferentially extending series of projections 75 formed by punching through the rim in an outward direction, and turning the burr incident to forcing the punch outward, the purpose of said projections or bosses being to prevent the slipping of the driving wheels. It will be appreciated, however, that the projections may be provided otherwise than by a punching process, so long as they are formed by outwardly forced or extending portions of the material or wall of the rim.

The periphery of the wheel or rim 72 is provided with inwardly extending side flanges 76, 76 to the inner one of which the periphery of a disc 77, or the ends of spokes of the wheel are secured by means of bolts 78; the central portion of the disc or spoke structure being secured to a central supporting hub 79 which rotates upon the axles 26 whereby the driving wheels are supported, as will be understood.

Figure 12 illustrates an alternative form of driving wheel in which the teeth of the driving pinions engage a rack 80, secured to the rim of the driving wheel by suitable bolts or rivets, as shown; the said teeth as well also as the walls 73 and 74 above mentioned constituting different forms of driving elements with which the teeth of the driving pinion 54 engage to drive the wheels, as will be appreciated.

Extending upwardly from the channel iron frame members 15 are two pedestals 81, 81 which support a fuel tank 82 which is held to the pedestals by bands 83, having threaded ends which extend through holes in the pedestals and receive nuts, or in any suitable way; and the cooling apparatus for cooling the liquid whereby the engine 16 is cooled is located beneath the fuel tank. Said cooling mechanism comprises an external casing 84 supported from the frame members 15, and within which a cooling chamber 85 is located; the walls of the casing and of the chamber being spaced apart to thereby provide an annular space through which air may flow and the wall of the cooling chamber being preferably corrugated to increase its heat radiating area, as illustrated.

Conduits 86, 87 communicate with the cooling chamber 85, the former leading from the upper end of the cooling jacket of the engine 16 and the latter leading to and discharging into an intermediate storage reservoir 88 from which a conduit 89 leads back to the jacket of the engine; and a current of air is caused to flow through the space between the chamber 85 and the casing 84 by a fan 90 located adjacent one end of the casing and preferably just within the end thereof, said fan being shown as rotatable about the conduit 86 as a support, and which fan is driven from the crank shaft of the engine through a suitable belt 91 and pulley 92 operatively connected with said fan to communicate motion thereto.

Having thus described and explained my invention, I claim and desire to secure by Letters Patent:

1. In a tractor, a driving wheel having a rim which contacts with the ground and supports the load upon the wheel, and which rim is provided with a series of spaced driving elements arranged circumferentially thereof; a driving shaft having an extending collar or flange; a two-part driving pinion the teeth of which engage the driving elements aforesaid to thereby drive the wheel; a ring adapted to lie within recesses provided in the parts of said driving pinion when they are assembled to form a complete pinion; and means for securing said ring and pinion parts together and to the flange aforesaid upon said driving shaft.

2. In a tractor, a driving wheel having a rim which contacts with the ground and supports the load upon the wheel, and which rim is provided with a series of spaced driving elements arranged circumferentially thereof; a driving shaft having an extending collar or flange; a two-part driving pinion the teeth of which engage the driving elements aforesaid to thereby drive the wheel; means for securing the parts of said driving pinion to said flange; and means other than said securing means for holding said parts together to thereby strengthen the pinion.

3. In a tractor, two driving wheels arranged one in front of the other and having each a rim which contacts with the ground and supports the load upon the wheel, and which rims are provided each with a series of spaced driving elements arranged circumferentially thereof; a driving shaft having an extending flange or collar; a two-part driving pinion carried by said shaft and located between said wheels and the teeth of which pinion engage the driving elements aforesaid in both said wheels to thereby drive both said wheels; a ring whereby the two parts of said pinion are secured together; and means other than said ring for securing the two parts of said pinion and said ring together and to said flange.

4. In a tractor, a suitable frame; two levers arranged alongside and spaced apart from one another and the central portions of which are pivotally supported from said frame; two driving wheels supported between the ends of said levers and located one upon each side of said central pivotal support, and the peripheral or ground engaging rims of which wheels are provided each with a series of circumferentially arranged driving elements; a driving shaft having an extending collar or flange, and the axis of which shaft is concentric with the axis of the pivotal support aforesaid; a two-part driving pinion carried by said shaft and located between said wheels and the teeth of which pinion engage the driving elements aforesaid of both said wheels to thereby drive both said wheels; a ring whereby the two parts of said pinion are secured together; and means other than said ring for securing the two parts of said pinion and said ring together and to said flange.

5. In a tractor, a suitable frame; two pairs of driving wheels located one pair at each side of the tractor; two pairs of levers supported from said frame and located one pair at each side of the tractor, the levers of each pair being pivotally supported at their middle portions; a pair of wheels located between each pair of levers, and which wheels are arranged one in front of the other; two springs associated with each of said pairs of levers and located one upon each side of the pivotal support aforesaid, and which springs are operatively connected with the free ends of said pairs to thereby maintain them in a central position; an engine supported by said frame; and two driving mechanisms through which the pairs of driving wheels at each side of the tractor are driven from said engines.

6. In a tractor, a suitable frame having depending end plates located one at each side of the tractor; two pairs of driving wheels located one pair at each side of the tractor, and which wheels are supported one pair adjacent each end plate; an engine supported by said frame and the crank shaft of which extends substantially parallel with said frame; two driving members secured one to each end of the crank shaft of the engine; two transmission mechanisms through which the pairs of driving wheels at each side of the tractor are driven each pair from one of the driving members aforesaid, and each pair independently of the other pair and either in a forward or in a reverse direction; and a draw bar extending substantially parallel with the crank shaft of the engine and the ends of which are secured to the end plates aforesaid.

7. In a tractor, a suitable frame having depending end plates located one at each side of the tractor; two pairs of driving wheels located one pair at each side of the tractor and which wheels are supported one pair adjacent each end plate; an engine supported by said frame and the crank shaft of which extends substantially parallel with said frame and transverse to the path of travel of the tractor; a draw bar extending between and the ends of which are secured to said end plates, and which draw bar extends substantially parallel with the said crank shaft; and means whereby said driving wheels are operated from said engine, each pair independently of the other pair and either in a forward or in a reverse direction.

8. In a tractor, a suitable frame having depending end plates located one at each side of the tractor; two driving wheels located one at each side of the tractor and which wheels are supported one adjacent each end plate; an engine supported by said frame; a draw bar extending between and the ends of which are removably secured to said end plates; and means whereby said driving wheels are operated from said engine.

9. In a tractor, a suitable frame having depending members located one at each end thereof; two pairs of driving wheels located one pair at each side of the tractor, and which wheels are supported one pair adjacent and upon the outer side of each of said members; an engine supported by said frame; a draw bar extending between and the ends of which are removably secured to said end members; and means whereby said driving wheels are operated from said engine.

In testimony whereof I affix my signature.

JOHN M. MEYERS.